United States Patent
Rawal et al.

(10) Patent No.: US 12,175,437 B1
(45) Date of Patent: Dec. 24, 2024

(54) AUTOMATIC PAYMENT BATCHING AND RELEASE IN AN ONLINE PROCUREMENT SYSTEM

(71) Applicant: Coupa Software Incorporated, San Mateo, CA (US)

(72) Inventors: Tushar Maheshbhai Rawal, San Ramon, CA (US); Adam Alphin, Suffolk, VA (US); Rajiv Ramachandran, San Ramon, CA (US); David Williams, San Leandro, CA (US); Rohit Jalisatgi, Dublin, CA (US); Matthew Pasquini, San Francisco, CA (US); Thomas Brent Knott, Sarasota, FL (US); Faraz Ahmed Qureshi, Queens, NY (US)

(73) Assignee: Coupa Software Incorporated, San Mateo, CA (US)

( * ) Notice: Subject to any disclaimer, the term of this patent is extended or adjusted under 35 U.S.C. 154(b) by 185 days.

(21) Appl. No.: 16/915,991

(22) Filed: Jun. 29, 2020

(51) Int. Cl.
*G06F 9/44* (2018.01)
*G06F 8/34* (2018.01)
(Continued)

(52) U.S. Cl.
CPC ....... *G06Q 20/102* (2013.01); *G06F 16/2379* (2019.01); *G06Q 20/108* (2013.01);
(Continued)

(58) Field of Classification Search
CPC ............... G06Q 20/102; G06Q 20/108; G06Q 30/0201; G06Q 40/02; G06Q 40/12; G06Q 30/04; G06Q 30/0633; G06F 16/2379
See application file for complete search history.

(56) References Cited

U.S. PATENT DOCUMENTS

| 8,543,503 B1 * | 9/2013 | Harris | G06Q 30/04 |
| | | | 705/40 |
| 8,543,504 B1 * | 9/2013 | Harris | G06Q 30/04 |
| | | | 705/40 |

(Continued)

OTHER PUBLICATIONS www.xytechsystems.com, "PO Invoice Reconciliation Step-by-Step", https://www.xytechsystems.com/help/po_invoice_reconciliation_step-by-step.htm, last viewed on Apr. 1, 2020, 6 pages.

(Continued)

*Primary Examiner* — Talia F Crawley
(74) *Attorney, Agent, or Firm* — Baker Botts L.L.P.

(57) ABSTRACT

In an embodiment, a computer-implemented method comprises storing invoice data comprising a plurality of invoice objects, each invoice object comprising a digital programmatic object that is maintained in computer memory, each invoice object comprising one or more data fields that are programmatically linked to and storing data for an invoice between a supplier account and a buyer account, the one or more data fields including a remittance address that specifies an address to which a payment is to be sent; determining, based on the plurality of invoice objects, a set of unique remittance addresses, each unique remittance address of the set of unique remittance addresses associated with a distinct supplier account; generating a first set of payment objects based on the set of unique remittance addresses, each payment object of the first set of payment objects associated with a unique remittance address of the set of unique remittance addresses; determining, based on the plurality of invoice objects, that a particular unique remittance address of the set of unique remittance addresses is associated with multiple buyer entities of a particular buyer account; in response to determining that the particular unique remittance address of the set of unique remittance addresses is associated with the multiple buyer entities of the particular buyer (Continued)

account, generating a second set of payment objects, each payment object of the second set of payment objects associated with the particular unique remittance address and a distinct buyer entity of the multiple buyer entities; causing multiple payment transactions based on the first set of payment objects and the second set of payment objects.

3 Claims, 4 Drawing Sheets

(51) Int. Cl.
*G06F 8/36* (2018.01)
*G06F 16/23* (2019.01)
*G06Q 20/10* (2012.01)
*G06Q 30/0201* (2023.01)
*G06Q 40/02* (2023.01)
*G06Q 40/12* (2023.01)
*G06Q 30/04* (2012.01)
*G06Q 30/0601* (2023.01)

(52) U.S. Cl.
CPC ......... *G06Q 30/0201* (2013.01); *G06Q 40/02* (2013.01); *G06Q 40/12* (2013.12); *G06Q 30/04* (2013.01); *G06Q 30/0633* (2013.01)

(56) References Cited

U.S. PATENT DOCUMENTS

| | | | | |
|---|---|---|---|---|
| 10,331,422 | B1* | 6/2019 | Russell | G06F 8/36 |
| 2003/0220855 | A1* | 11/2003 | Lam | G06Q 30/04 |
| | | | | 705/34 |
| 2003/0220858 | A1* | 11/2003 | Lam | G06Q 30/04 |
| | | | | 705/34 |
| 2003/0220875 | A1* | 11/2003 | Lam | G06Q 20/042 |
| | | | | 705/45 |
| 2003/0220886 | A1* | 11/2003 | Lam | G06Q 20/02 |
| | | | | 705/71 |
| 2008/0086396 | A1* | 4/2008 | Hahn-Carlson | G06Q 30/06 |
| | | | | 705/40 |
| 2014/0337188 | A1* | 11/2014 | Bennett | G06Q 20/102 |
| | | | | 705/40 |
| 2015/0127523 | A1* | 5/2015 | Schaper | G06Q 30/04 |
| | | | | 705/38 |
| 2016/0012465 | A1* | 1/2016 | Sharp | G06Q 20/321 |
| | | | | 705/14.17 |
| 2016/0274813 | A1* | 9/2016 | Masputra | G06F 3/0604 |
| 2017/0180513 | A1* | 6/2017 | Doyle | G06Q 20/108 |
| 2018/0081645 | A1* | 3/2018 | Alurralde Iturri | G06F 8/35 |
| 2019/0139008 | A1* | 5/2019 | Moore | G06Q 20/385 |
| 2019/0272169 | A1* | 9/2019 | Russell | G06F 8/35 |
| 2020/0329156 | A1* | 10/2020 | Mathiyalagan | H04M 15/51 |
| 2021/0365919 | A1* | 11/2021 | Kumar | G06Q 40/10 |
| 2021/0374348 | A1* | 12/2021 | Dasgupta | G06N 3/044 |
| 2021/0390128 | A1* | 12/2021 | Dasgupta | G06N 3/045 |
| 2022/0198576 | A1* | 6/2022 | Shields | G06N 20/00 |
| 2023/0047837 | A1* | 2/2023 | Chilupuri | G06F 9/547 |

OTHER PUBLICATIONS

Spscommerce.com, "Evaluating Your EDI Options" Seven Building Blocks of Full-Service EDI, dated 2019, 22 pages.

Rudd, Brian, "Automated Purchase Order to Invoice Reconciliation for Retailers", https://www.spscommerce.com/blog/automated-purchase-order-to-invoice-reconciliation-spsc/, dated Mar. 28, 2018, 8 pgs.

AroFlo Documentation, "Reconcile Purchase Orders", Office Documentation, https://help.aroflo.com/display/office/Reconcile+Purchase+Orders, last viewed on Apr. 1, 2020, 8 pages.

* cited by examiner

AUTOMATIC PAYMENT BATCHING AND RELEASE IN AN ONLINE PROCUREMENT SYSTEM

TECHNICAL FIELD

One technical field of the present disclosure is automatic aggregation and batch processing of data in distributed computer systems. Other technical fields are computer-implemented spend management and e-procurement systems, enterprise resource planning (ERP) and financial data management systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Federated electronic spend management systems have been deployed to help buyers or buyer accounts manage their electronic procurement or purchasing activities. Historically, to facilitate such activities, one computing system is used for gathering supplier data and onboarding suppliers. "Onboarding" refers to a process of collecting digital data from a supplier, adjusting configuration values, storing data in databases and otherwise electronically preparing the system to interoperate with a supplier. Another system is used for procurement activities such as providing a marketplace for supplier listed commodities and to create purchase order and invoices for supplier listed items. Yet another system is used for processing payments that are related to purchase orders and invoices created in a different system. Thus, many pieces of related procurement data exist in separate, segregated systems.

Using such segregated systems, buyers may struggle to conduct digital communications to make payments to their suppliers in a simple and scalable manner. A difficulty arises in that suppliers prefer payment using different payment methods like checks, bank transfers, wires, and cards while the funds from where buyers pay suppliers can come from different sources such domestic bank accounts, international bank accounts, and credit card accounts.

To make such payments to suppliers, buyers typically use a set of disconnected systems such as, for example, using check payments from one system and card payments from another system. Even if a single system supports multiple payment methods for paying suppliers, such systems do not allow buyers to seamlessly pull funds from multiple payment accounts, including domestic and international accounts. Additionally, even if a system supports multiple payment methods, buyers are unable to easily connect different payment methods to legal entities in their accounting system and provide flexibility to the buyer to initiate these payments from each of their legal entities. Thus, computer implemented techniques are desired to efficiently and automatically batch and release payments in federated electronic spend management systems. Computer-implemented techniques disclosed herein address these and other issues.

SUMMARY

The appended claims may serve as a summary of the invention.

DETAILED DESCRIPTION

Figure 1:
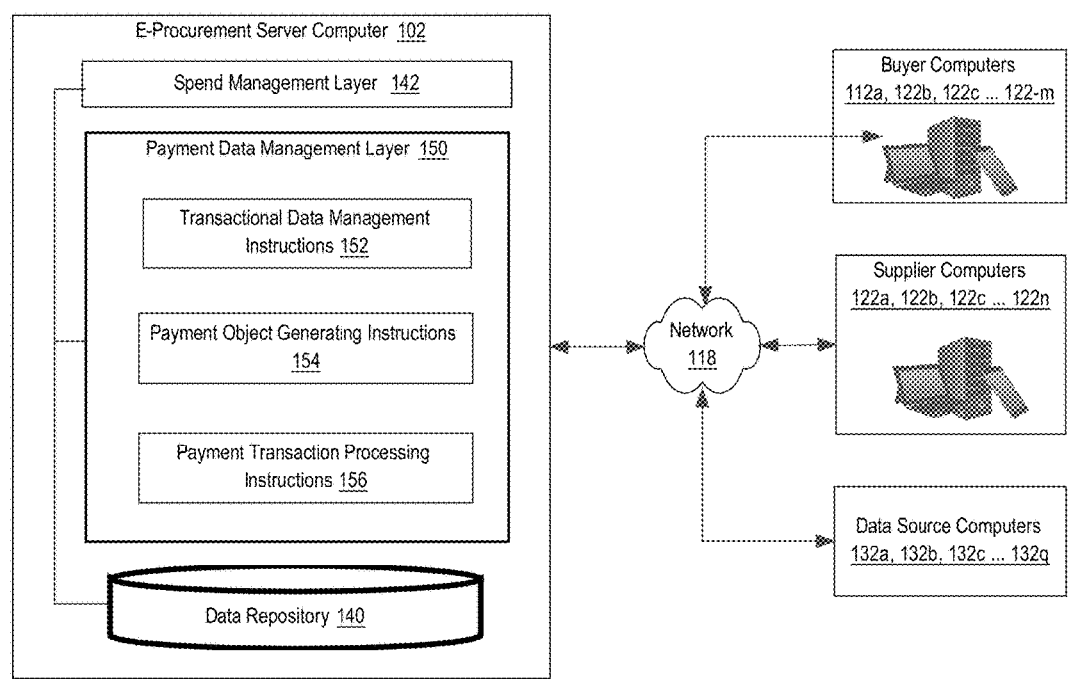
FIG. 1 depicts an example networked computing system, according to an embodiment.

In the following detailed description, for the purposes of explanation, numerous specific details are set forth in order to provide a thorough understanding of various embodiments of providing automatically batch and release payments in federated electronic spend management systems. It will be apparent, however, that the embodiments may be practiced without these specific details. In other instances, well-known structures and devices are shown in block diagram form in order to avoid unnecessarily obscuring the embodiments.

Embodiments are described in sections according to the following outline:
1.0 GENERAL OVERVIEW
2.0 EXAMPLE NETWORKED COMPUTER SYSTEM
3.0 EXAMPLE NETWORKED COMPUTER ENVIRONMENT
4.0 EXAMPLE PROCEDURE
5.0 IMPLEMENTATION EXAMPLE
6.0 IMPLEMENTATION EXAMPLE-HARDWARE OVERVIEW
7.0 EXTENSIONS AND ALTERNATIVES

1.0 General Overview

Techniques are provided for providing automatic payment batching and release in an online procurement system. In an embodiment, a computer-implemented method comprises storing, in one or more data repositories, transactional data relating to past transactions between a plurality of buyer entities and a plurality of supplier entities, the transactional data including invoice data comprising a plurality of invoice objects, each invoice object comprising a digital programmatic object that is maintained in computer memory, each invoice object comprising one or more data fields that are programmatically linked to and storing data for an invoice between a supplier account and a buyer account, the one or more data fields including a remittance address that specifies an address to which a payment is to be sent; determining, based on the plurality of invoice objects, a set of unique remittance addresses, each unique remittance address of the set of unique remittance addresses associated with a distinct supplier account; generating a first set of payment objects based on the set of unique remittance addresses, each payment object of the first set of payment objects associated with a unique remittance address of the set of unique remittance addresses; determining, based on the plurality of invoice objects, that a particular unique remittance address of the set of unique remittance addresses is associated with multiple buyer entities of a particular buyer account; in response to determining that the particular unique remittance address of the set of unique remittance addresses is associated with the multiple buyer entities of the particular buyer account, generating a second set of payment objects, each payment object of the second set of payment objects associated with the particular unique remittance address and a distinct buyer entity of the multiple buyer entities; causing multiple payment transactions based on the first set of payment objects and the second set of payment objects.

Using the above discussed techniques, the efficiency of batching payments and executing a batch of payments in an online procurement system is improved. By building a set of payment data objects and adjusting the size of the set of payment data objects before populating the set of payment data objects, multiple payment transactions can be initiated and executed for a requesting buyer account that include multiple buyer legal entities. Using these techniques, resources and memory are conserved by reducing the amount computing resources required to initiate and execute multiple simultaneous payment transactions. Thus, the techniques herein result in a payment batching process that uses fewer CPU cycles and less memory to complete.

Furthermore, the techniques disclosed herein address practical and real deficiencies in the state of the art concerning electronic digital data organization, communication and interoperability. The disclosure does not address a business problem or a payment problem, but focuses on specific and practical ways to operate digital computers in a manner not previously possible to accomplish new forms data organization, transfer and communication processes. While these techniques may have an operational relationship to payment processing, the goal of the disclosure is not to address a business, payment or financial problem but to provide better computing architecture and processes.

2.0 Example Networked Computer System

FIG. 1 illustrates an example networked computer system with which various embodiments may be practiced. FIG. 1 is shown in simplified, schematic format for purposes of illustrating a clear example and other embodiments may include more, fewer, or different elements.

In some embodiments, the networked computer system comprises an e-procurement server computer 102 ("server"), one or more supplier computers 122a-n, one or more buyer computers 112a-m, and one or more data source computers 132, which are communicatively coupled directly or indirectly via one or more networks 118.

In some embodiments, the server 102 broadly represents one or more computers, such as a server farm, a cloud computing platform, or a parallel computer, virtual computing instances, and/or instances of a server-based application.

The server 102 may comprise a spend management layer 142 that is programmed or configured to host or execute functions including but not limited to managing buyer accounts associated with the one or more buyer computers 112a-m and supplier accounts associated with the one or more supplier computers 122a-n, and facilitating generation and maintenance of digital documents during procurement transactions between buyer accounts and supplier accounts, such as catalogs, purchase requisitions, purchase orders, or invoices. The server 102 also comprises a payment data management layer 150 that is programmed or configured to host or execute functions including but not limited to generate sets of payment objects, populate such payment objects with buyer and supplier payment account data, causing payment transactions based on such payment objects.

A buyer account may comprise, or be linked with, one or more buyer entities. Similarly, a seller account may comprise, or be linked with, one or more seller entities. An entity, such as a buyer entity or seller entity, may comprise a legal entity or a subgroup/division of a buyer or seller account. A buyer entity or seller entity may be associated with one or more payment accounts. A payment account comprises a digital programmatic object maintained in computer memory and defines payment account data related to a respective supplier or buyer account. Payment account data may include data that specifies a payment account ID, a payment model (e.g. bank account, credit card, digital check, virtual card), a currency type (e.g. USD), and a remittance address and in some embodiments, may include any data that is used to execute a payment transaction, as described herein.

FIG. 1 also illustrates example components of the server 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the payment data management layer 150 can comprise computer-executable instructions, including transactional data management instructions 152, payment object generating instructions 154, and payment transaction processing instructions 156. In addition, the server 102 can comprise a data repository 140.

In some embodiments, the transactional data management instructions 152 enable collecting and transmitting transactional data or documents, such as catalogs, purchase requisitions, purchase orders, or invoices, between supplier computers and buyer computers and maintaining the transactional data in memories. The transactional data management instructions 152 may enable storing invoice data as invoice objects. An invoice object comprises a digital programmatic object maintained in computer memory and defines data fields associated with an invoice. A data field may include an invoice identification (ID), a total amount due of an invoice, a supplier account identification (ID), a buyer account ID, a legal entity associated with a buyer account, a currency type (i.e. USD), a payment method (i.e. bank transfer, check), a remittance address that specifies an address to which a payment is to be sent to be processed.

In some embodiments, the payment object generating instructions 154 enable generating payment objects based on invoice data and payment account data. A payment object may include data fields specifying a payment ID, a buyer payment account ID, a supplier payment account ID, an amount to be paid, a currency type, exchange rate.

In some embodiments, the payment transaction processing instructions 156 enable facilitating or causing payment transactions based on payment objects generated by the payment object generating instructions 154. Using data from payment objects, the payment transaction processing instructions 156 may send requests to external computing devices to execute a payment transaction. An example of an external computing device is server computing operated by an entity such as Wells Fargo Bank. The external computing device determines a result of payment authorization, transfers funds from one payment account to another payment account and sends the results of the authorization and transfer of funds to server computer to complete the payment transaction.

The payment data management layer 150 may also include instructions that send alerts or recommendations to a buyer computer of a buyer account.

In some embodiments, the data repository 140 is programmed or configured to manage relevant data structures and store relevant data for functions performed by the server 102. In association with the payment data management layer 150, the data may include invoice data and payment account data.

In some embodiments, each of the buyer computers 112a-m broadly represents one or more computers, virtual computing instances, and/or instances of an e-procurement application program that are associated with an institution or entity that is related as a buyer account with respect to a separate entity associated with one of the supplier computers 122a-n. Throughout this disclosure, reference numerals of the form 122a-n refer to an arbitrary number of one or more units that could be designated 122a, 122b, 122c and so forth up to 122n. A buyer computer 112a is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102. The buyer computer 112a may comprise a desktop computer, laptop computer, tablet computer, smartphone, wearable device, or any other type of computing device that is capable of proper communication with the server 102 as well as adequate local data processing and storage. In some cases, a buyer computer 112a may be a personal computer or workstation that hosts or executes a browser and communicates via HTTP and HTML over the network 118 with a server-side e-procurement application hosted or executed at the server 102. In other cases, a buyer computer 112a may be a server-class computer and/or virtual computing instance that hosts or executes an instance of an e-procurement application that communicates programmatically via API calls, RPC or other programmatic messaging with the server 102.

Similarly, in some embodiments, each of the supplier computer 122a-n broadly represents one or more computers, virtual computing instances, and/or instances of an e-procurement application program that are associated with an institution or entity that is related as a supplier with respect to a separate entity associated with one of the buyer computer 112a-m. A supplier computer 122a is programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102. A supplier computer 122a may comprise a desktop computer, laptop computer, tablet computer, smartphone, wearable device, or any other type of computing device that is capable of proper communication with the server as well as adequate local data processing and storage. In some cases, a supplier computer 122a may be a personal computer or workstation that hosts or executes a browser and communicates via HTTP and HTML over network 118 with a server-side e-procurement application hosted or executed at the server 102. In other cases, a supplier computer 122a may be a server-class computer and/or virtual computing instance that hosts or executes an instance of an e-procurement application that communicates programmatically via API calls, RPC or other programmatic messaging with the server 102.

In some embodiments, each of the data source computer 132a-q broadly represents one or more computers, virtual computing instances, and/or instances of a data management application program with a communication interface. A data source computer 132a is programmed to manage one or more data sources, receive a request for certain data in the one or more data sources from the server 102, and send a response to the request to the server 102. The data source computer 132a can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, through the payment data management layer 150, the server 102 is programmed to receive or transmit transactional data, such as invoice data, from or to the buyer computers 112a-m or the supplier computers 122a-n. The server 102 is programmed to also store such invoice data as supplier invoice objects in a storage device, such as the data repository 140. The server 102 is programmed to further determine a set of unique remittance addresses based on invoice data and generate payment objects based on the set of unique remittance addresses. The server 102 is programmed to further determine that a particular unique remittance address of the set of unique remittance addresses is associated with multiple buyer entities of a particular buyer account and generate payment objects associated with the particular unique remittance address and a distinct buyer entity of the multiple buyer entities. The server 102 is programmed to further populate such payment objects with buyer and supplier payment account data and cause payment transactions based on such payment objects.

3.0 Example Networked Computing Environment

Figure 2:
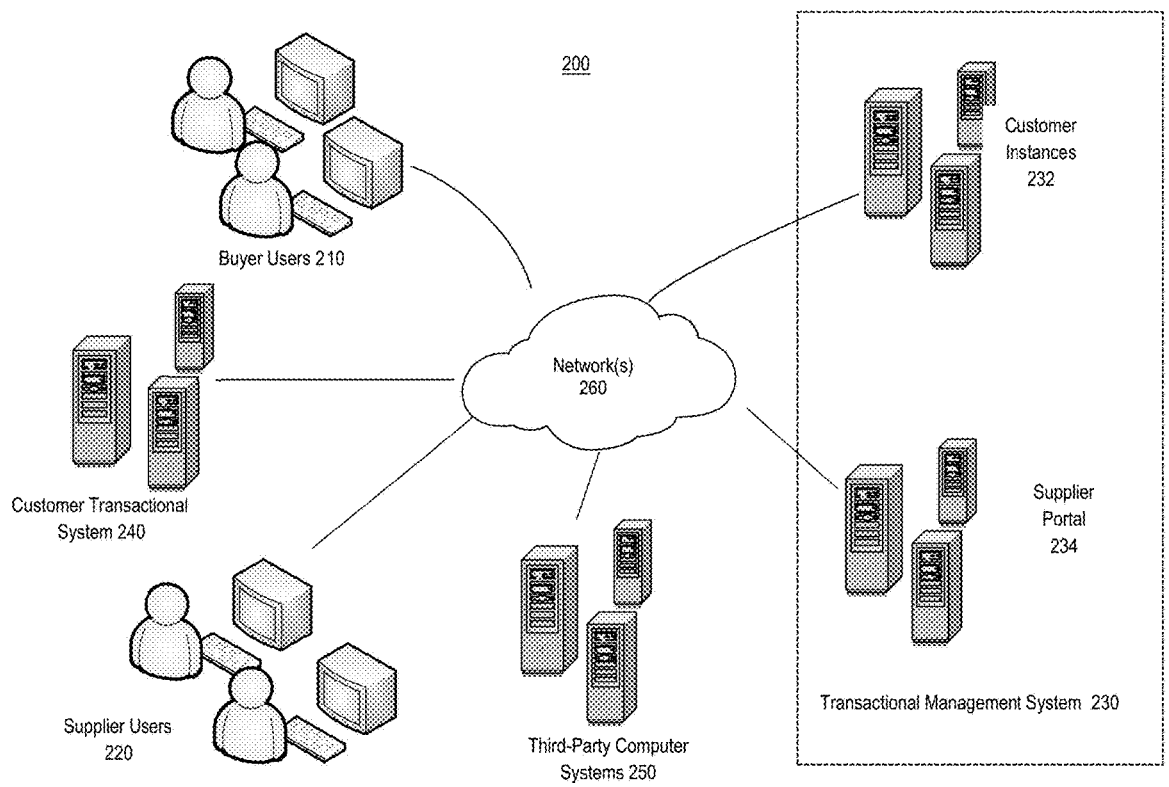
FIG. 2 depicts an example networked computing environment, according to an embodiment.

FIG. 2 depicts an example networked computing environment 200 in which techniques for providing automatically batch and release payments in federated electronic spend management systems may be implemented.

Environment 200 includes buyer users 210 with their respective personal computer systems, customer transactional system 240, supplier users 220 and their respective personal computer systems, third-party computer systems 250, network(s) 260, and transactional management system 230 that includes customer instances 232 and supplier portal 234. While the term "users" is used for familiarity and clarity, embodiments provide for the programmatic manipulation of data associated with user accounts, records or other digitally stored entities that are capable of storage, transmittal, transformation and input/output by machine, and all references to "users" are intended to reference such accounts, records or entities, so that the scope of the claims does not encompass methods of organizing human behavior. In an embodiment, transactional management system 230 is configured or programmed to execute the transactional data management instructions 152 (FIG. 1).

In an embodiment, computer systems of supplier users 220 are configured or programmed as supplier computers 122*a-n* (FIG. 1) and computer systems of buyer users 210 are configured or programmed as buyer computers 112*a-m* (FIG. 1).

Customer instances 232 may store supplier payment information corresponding to buyer-selected supplier users. For example, customer instances 232 may be configured to receive incoming supplier invoice data from supplier users 220 through the network 260. Transactional management system 230 may receive and collect incoming supplier invoices from the customer instances 232. Alternatively, a customer portal of the transactional management system 230 receives and collects supplier invoice data through the network 260. A customer instance may broadly represent a copy of a customer electronic transactional system, such as ERP.

Buyer users 210 use their computers to interact with transactional management system 230 over network(s) 260 according to one or more online interaction protocols. The computers can include desktop computers, laptop computers, tablet computers, mobile phones, or like personal computing devices. The online interaction protocol(s) may be supported by both a client application that executes at the personal computers of the buyer users 210 and a server application that executes at one or more server computers that host the transactional management system 230. For example, the client application and the server application may exchange data over network(s) 260 using the HTTP/S networking protocol. The data exchanged may be formatted in a variety of different ways including for example as HTML, CSS, Javascript, XML, JSON, etc. The client application may be an industry-standard web browser application or a mobile application, for example. The transactional management system 230 may cause particular graphical user interfaces (e.g., web pages with particular content) to be displayed by the client applications at the personal computers of the buyer users 210 by using the online interaction protocol(s) and network(s) 260 to send information to the computers of the buyer users 210 for processing by the client applications. Buyer users 210 may interact with the transactional management system 230 by directing user input (e.g., keyboard, pointing device or touch input) to the graphical user interfaces, thereby causing the client applications to use the online interaction protocol(s) to send information over network(s) 260 to the spend management system 230. Supplier users 220 may likewise use their personal computers to interact with the transactional management system 230 over network(s) 260 according to the online interaction protocol.

Transactional management system 230 may be hosted in a public cloud. The public cloud may include computing services offered by third-party providers over the public internet (e.g., network(s) 260), making them available to anyone who wants to use or purchase them. The computing services may be sold on-demand, allowing the transactional management system 230 provider to pay only per usage for the CPU cycles, storage or bandwidth consumed. Even though the provider of transactional management system 230 may not also provide the public cloud computing services, the transactional management system 230 provider may still be responsible for management and maintenance of the transactional management system 230 within the public cloud, including putting the transactional management system 230 in service on network 260.

In an example embodiment, customer transactional system 240 may comprise a transaction application program that facilitates and processes payment transactions, and stores payment transaction data. A payment transaction is a process or communication that is carried out between a buyer account and a supplier account to exchange payment for a commodity. A payment transaction generally involves a change in the status of the finances of two or more entities or accounts. In an example embodiment, customer transactional system 240 may be a customer enterprise resource planning (ERP) system. Customers transactional system 240 and third-party systems 250 integrate with transactional management system 230 via network(s) 260. The purpose of the integration may be to communicate with other components of the system 200 in order to process payment transactions. For example, buyer users 210 may interact with customer transactional system 240 to make electronic payments to supplier users 220. Customer transactional system 240 includes instructions to facilitate a payment transaction between buyer users 210 and supplier users 220. In one embodiment, buyer users 210 initiate a payment transaction through customer transactional system 240. Before completing the payment transaction, customer transactional system 240 communicates with transactional management system 230 to determine whether the pending payment transaction should be completed. Once a pending payment transaction is completed, customer transactional system 240 may transmit payment metadata relating to a completed payment transaction to transactional management system 230 for further processing.

As shown in FIG. 2, customer transactional system 240 is depicted as a separate entity from transactional management system 230. However, in some embodiments, customer transactional system 240 may be included as a software and hardware component of transactional management system 230 that communicates with other components of the transactional management system 230 in order to process payment transactions The purpose of the integration may also be to import supplier invoice and associated information into transactional management system 230. Such records and data imported into the transactional management system 230 from customer transactional system 240 and third-party systems 250 may be processed by applications of the transactional management system 230 including an application that implements techniques disclosed herein.

The integration over network(s) 260 may be accomplished using one or more data integration protocols. One possible integration protocol is using flat files uploaded to and downloaded from a secure file transfer protocol (SFTP) server operated by the transactional management system 230 provider. The flat files may be CSV files, for example, that contain spend approval cycle time statistics and associated information. Another possible integration protocol for importing supplier information data is using a REST API offered by servers of the transactional management system 230. For example, the flat file integration protocol may be used for bulk import of supplier information, and the REST API integration protocol may be used for real-time import of supplier information including supplier invoice data.

4.0 Example Procedure

Figure 3:
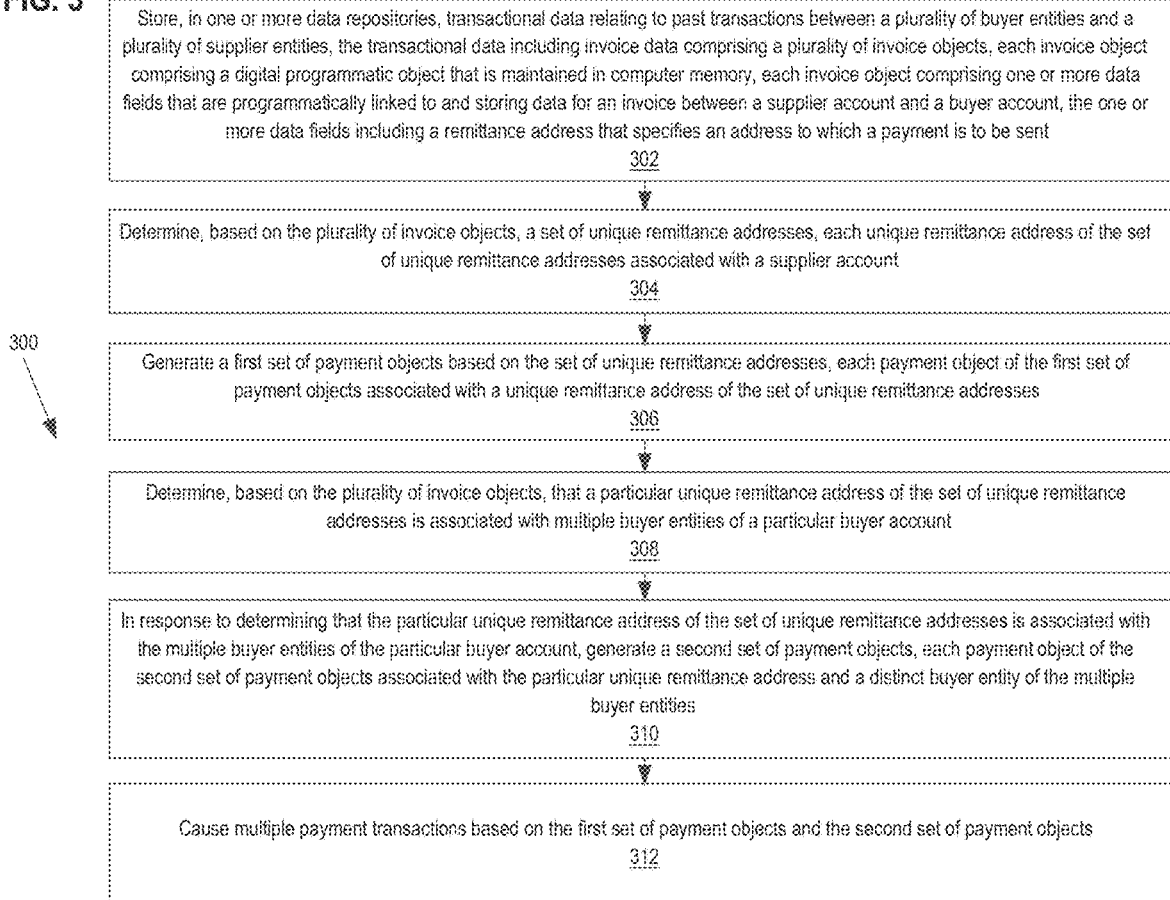
FIG. 3 depicts a flowchart of an example process for providing automatic payment batching and release in an online procurement system, according to an embodiment.

FIG. 3 depicts a flowchart of an example process 300 for providing automatic payment batching and release in an online procurement system. FIG. 3 is shown in simplified, schematic format for purposes of illustrating a clear example and other embodiments may include more, fewer, or different elements connected in various manners. FIG. 3 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 302, the server 102 is programmed or configured to store, in one or more data repositories, transactional data relating to past transactions between a plurality of buyer entities and a plurality of supplier entities, the transactional data including invoice data comprising a plurality of invoice objects, each invoice object comprising a digital programmatic object that is maintained in computer memory, each invoice object comprising one or more data fields that are programmatically linked to and storing data for an invoice between a supplier account and a buyer account, the one or more data fields including a remittance address that specifies an address to which a payment is to be sent. The plurality of invoice objects is associated with a particular buyer account. The particular buyer account is associated with or linked to multiple buyer entities, such as multiple buyer legal entities. Thus, a single buyer account may be associated with multiple buyer legal entities.

A remittance address specifies an address to which a payment is to be sent to be processed. In some embodiments, a remittance address may comprise a destination bank account address associated with a supplier account. In other embodiments, the remittance address may comprise a mailing address associated with a supplier account. Each remittance address is mapped to a supplier payment account and corresponding supplier payment account data.

In some embodiments, in step 304, the server 102 is programmed or configured to determine, based on the plurality of invoice objects, a set of unique remittance addresses, each unique remittance address of the set of unique remittance addresses associated with a supplier account. For example, the plurality of invoice data objects stored in data repository 140 is queried by server 102 to determine a set of unique remittance addresses. A remittance address is unique in the set of unique remittance addresses by not being a duplicate of any other remittance addresses in the set of unique remittance addresses.

In some embodiments, in step 306, the server 102 is programmed or configured to generate a first set of payment objects based on the set of unique remittance addresses, each payment object of the first set of payment objects associated with a unique remittance address of the set of unique remittance addresses. For example, server 102 generates a payment object for each of the unique remittance addresses in the set of unique remittance addresses identified in step 304.

In some embodiments, when the first set of payment objects are generated, the payment objects are not fully populated with data. Instead, a structure or shell of a payment object is generated and a reference is inserted into the structure or shell of the payment object that refers to a supplier payment account and a buyer payment account. The remittance address associated with a respective payment object is located in supplier payment account data associated with the supplier payment account reference of the respective payment object.

In some embodiments, in step 308, the server 102 is programmed or configured to determine, based on the plurality of invoice objects, that a particular unique remittance address of the set of unique remittance addresses is associated with multiple buyer entities of a particular buyer account. For example, the plurality of invoice data objects stored in data repository 140 is queried by server 102 to identify or determine that a particular unique remittance address identified in step 304 is associated with multiple buyer entities of a particular buyer account. This step may include determining that a remittance address is associated with multiple invoice data objects and also determining that each of the multiple invoice data objects is associated with a different buyer entity of the particular buyer account. As discussed herein, a buyer account may comprise, or be linked with, one or more buyer entities. A buyer entity may comprise a buyer legal entity or a subgroup/division of a buyer account.

In some embodiments, in step 310, the server 102 is programmed or configured to, in response to determining that the particular unique remittance address of the set of unique remittance addresses is associated with the multiple buyer entities of the particular buyer account, generate a second set of payment objects, each payment object of the second set of payment objects associated with the particular unique remittance address and a distinct buyer entity of the multiple buyer entities. For example, server 102 generates a payment object for each of the multiple buyer entities of the particular buyer account. Thus, each payment object of the second set of payment objects is associated with a distinct buyer entity of the multiple buyer entities of the particular buyer account and the particular unique remittance address.

In some embodiments, when the second set of payment objects are generated, the payment objects are not fully populated with data. Instead, a structure or shell of a payment object is generated and a reference is inserted into the structure or shell of the payment object that refers to a supplier payment account and a buyer payment account. The remittance address associated with a respective payment object is located in supplier payment account data associated with the supplier payment account reference of the respective payment object. The buyer entity associated with a respective payment object is located in buyer payment account data associated with the buyer payment account reference of the respective payment object.

In some embodiments, the payment object of the first set of payment objects that is associated with the particular unique remittance address of the set of unique remittance addresses is removed or deleted from the first set of payment objects upon generating the second set of payment objects.

Once the first set of payment objects and second set of payment objects are generated, each payment object of the first set of payment objects and second set of payment objects is populated with payment account data, including supplier payment account data and buyer payment account data that is associated with each respective payment object.

In some embodiments, in step 312, the server 102 is programmed or configured to, cause multiple payment transactions based on the first set of payment objects and the second set of payment objects. As discussed herein, a payment transaction is a process or communication that is carried out between a buyer account and a supplier account to exchange payment for a commodity. A payment transaction generally involves a change in the status of the finances of two or more entities or accounts. For example, server 102 may communicate with an ERP system in order to process payment transactions. The ERP system may transmit payment metadata relating to a completed payment transaction to server 102 to indicate that the payment transaction has been successfully completed.

In some embodiments, server 102 executes instructions that comprise functionality of a transaction application program. Thus, the server 102 may facilitate payment transactions and by executing such instructions to process payment transactions, such as facilitating the exchange of monetary consideration between a supplier account and buyer account.

In some embodiments, step 312 is performed in response to a single action by a buyer computer associated with a buyer account. For example, a buyer computer may select a 'Release Payment Batch' button in a graphical user interface (GUI). By selecting the button, an indication of the selection is sent to the server 102 which causes the multiple payment transactions based on the first set of payment objects and the second set of payment objects.

As another example, when a buyer clicks the 'Release Payment Batch' button, a single secure two factor authentication model allows the buyer to authorize funds drawn from multiple company financial accounts rather than the buyer having to do single sign on with every funds source account separately.

In some embodiments, for a payment object with a digital check payment model, a digital image of a check is automatically generated. The digital image of the check is then digital transmitted to the supplier as part of completing the payment transaction.

5.0 Implementation Example

As an example, assume Buyer Account A is linked to four legal entities including: Buyer_A1_US, Buyer_A2_US, Buyer_A_UK, Buyer_A_Australia. Assume Buyer A has payment accounts including: a USD Bank Account with JP Morgan in the US, USD Bank Account with Wells Fargo in the US, GBP Bank Account with Barclays in the UK, AUD Bank Account with Westpac in Australia, a USD Credit Account with AMEX.

Buyer Account A is attempting to pay the following invoices from the following Suppliers:
  a. Invoice 1: From Supplier A based in the U.S. and invoicing Buyer_A1_US in USD and who would like to be paid via bank transfer to Supplier A's Citi Bank Account.
  b. Invoice 2: From Supplier A based in the U.S. and invoicing Buyer_A2_US in USD and who would like to be paid via bank transfer to Supplier A's Citi Bank Account.
  c. Invoice 3: From Supplier B based in Germany and invoicing Buyer_A_UK in EUR and who would like to be paid via a bank transfer to Supplier B's HSBC Bank Account.
  d. Invoice 4: From Supplier C based in Australia and invoicing Buyer_A_US and who would like to be paid via AMEX to Supplier C's AMEX USD Account.
  e. Invoice 5: From Supplier C based in Australia and invoicing Buyer_A_Australia and who would like to be paid via a bank transfer to Supplier C's NAB Bank Account.
  f. Invoice 6: From Supplier D based in the US and invoicing Buyer_A1_US in USD and would like to be paid with a check to Supplier D's business address.

As discussed in step 304 of FIG. 3, a set of unique remittance addresses are determined based on the invoices. In this example, the set of unique remittance addresses includes five unique remittance addresses: Supplier A's Citi Bank Account, Supplier B's HSBC Bank Account, Supplier C's AMEX USD Account, Supplier C's NAB Bank Account, Supplier D's business address.

As discussed in step 306 of FIG. 3, a first set of payment objects is generated based on the set of unique remittance addresses. In this example the first set of payment objects includes the following payment objects with associated payment data that includes a remittance address for each payment object:
  a. Payment Object 1A
    i. Remit To: Supplier A's Citi Bank Account
  b. Payment Object 2A
    i. Remit To: Supplier B's HSBC Bank Account
  c. Payment Object 3A
    i. Remit To: Supplier C's AMEX USD Account
  d. Payment Object 4A
    i. Remit To: Supplier C's NAB Bank Account
  e. Payment Object 5A
    i. Remit To: Supplier D's business address.

As discussed in step 308 of FIG. 3, it is determined that a particular unique remittance address of the set of unique remittance addresses is associated with multiple buyer entities of a particular buyer account. In this example, the particular unique remittance address 'Supplier A's Citi Bank Account' is associated with buyer entities Buyer_A_US and Buyer_A2_US from Invoices 1 and 2.

As discussed in step 308 of FIG. 3, a second set of payment objects is generated, each payment object of the second set of payment objects associated with the particular unique remittance address and a distinct buyer entity of the multiple buyer entities. In this example, the second set of payment objects includes the following payment objects with associated payment data that includes a remittance address for each payment object:
  a. Payment Object 1B
    i. From: Buyer_A1_US
    ii. Remit To: Supplier A's Citi Bank Account
  b. Payment Object 2B
    i. From: Buyer_A2_US
    ii. Remit To: Supplier A's Citi Bank Account Once the second set of payment objects is generated, Payment Object 1A from the first set of payment objects is removed or deleted from the first set of payment objects. The payment objects from the first and second set of payment objects are then populated with payment account data including buyer payment data and supplier payment data. A batch of populated payment objects from the first and second set of payment objects includes six finalized payment objects such as:
  a. Payment Object 1C
    i. To: Supplier A
    ii. From: Buyer_A1_US
    iii. Remit To: Supplier A's Citi Bank Account
    iv. Payment Model: Domestic Bank Account
  b. Payment Object 2C
    i. To: Supplier A
    ii. From: Buyer_A2_US
    iii. Remit To: Supplier A's Citi Bank Account
    iv. Payment Model: Domestic Bank Account
  c. Payment Object 3C
    i. To: Supplier B
    ii. From: Buyer_A_UK, Barclays GBP Account
    iii. Remit To: Supplier B's HSBC Bank Account iv. Payment Model: Cross Border Payment
- d. Payment Object 4C
  - i. To: Supplier C
  - ii. From: Buyer_A_US, AMEX USD Account
  - iii. Remit To: Supplier C's AMEX USD Account
  - iv. Payment Model: Card Payment
- e. Payment Object 5C
  - i. To: Supplier C
  - ii. From: Buyer_A_Australia, Westpac AUD Account
  - iii. Remit To: Supplier C's NAB Bank Account
  - iv. Payment Model: Domestic Bank Account
- f. Payment Object 6C
  - i. To: Supplier D
  - ii. From: Buyer_A1_US, JPM USD Account
  - iii. Remit To: Supplier D's business address.
  - iv. Payment Model: Digital Checks The batch of payment objects is then used as a basis for causing multiple payment transactions where one payment transaction may be executed for each payment object. In some embodiments, each a batch of payment objects may include multiple different payment models. For example, a single set or batch of payment objects may include a first payment object with a cross border payment, a second payment object with a card payment, a third payment object with a digital check payment, a fourth payment object with a domestic bank account.

As shown in the batch of object objects, in some embodiments, buyer accounts may differ by buyer legal entity and/or currency type. Supplier accounts may differ by supplier entity and/or by payment model (i.e. bank account, virtual card, digital check), currency type, payment terms and/or discount rates.

Using the above discussed techniques, the efficiency of batching and executing payment transactions in an online procurement system is improved. By building a set of payment data objects and adjusting the size of the set of payment data objects before populating the set of payment data objects with payment account data, multiple payment transactions can be initiated for a requesting buyer account that includes multiple buyer entities. Compared to previous techniques, the amount of storage, CPU cycles and network bandwidth to create a batch of payment objects and initiate a group of payment transactions based on the batch is reduced.

For example, instead of populating payment data objects with payment account data before the batch of payment objects is finalized, payment data object shells (i.e. unpopulated payment data objects) are constructed in two stages—the first stage being based on a remittance address and the second stage being based on an amount of buyer legal entities. Once the batch of payment objects is set to an optimal size based on the first and second stages, each payment object of the batch is populated with payment account data and released to execute a transaction for each object. By performing the batching algorithm in stages, network bandwidth is conserved by only executing financial transactions based on payment objects that have been optimized by the batching algorithm. Additionally, computing resources such as storage and memory usage are conserved by only performing the creation and population of payment data objects that are necessary to a batch of transactions.

Additionally, the above discussed techniques provide a usability enhancement to buyer accounts using buyer computers that desire to batch and execute multiple payment transactions. For example, the above discussed techniques provide the flexibility to release an entire payment batch in one click to avoid doing the release in multiple different systems for different types of payments and different supplier-related payments. In some embodiments, a buyer account using a buyer computer can configure a batch of payment objects to be auto-released based a selected time and/or date. The auto-release functionality provides a buyer account the ability to schedule when a batch of payment objects is released to avoid any financial institution's cut-off time for processing payments for a given day.

6.0 Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
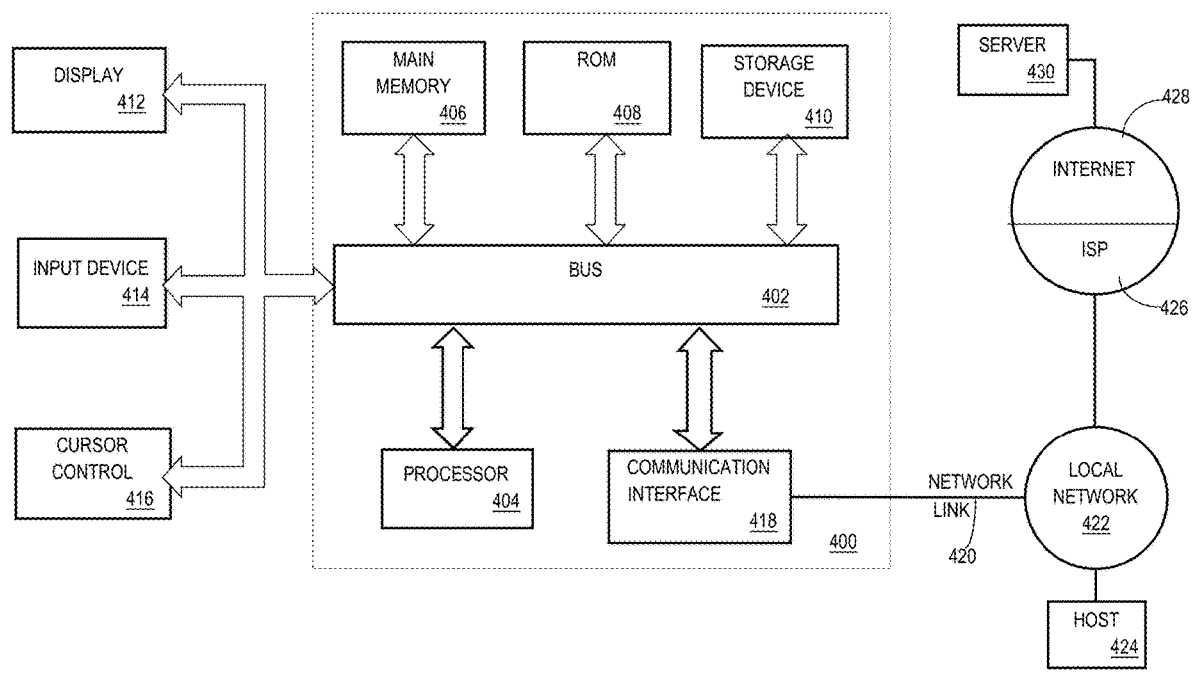
FIG. 4 is a block diagram that illustrates a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular digital data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. An e-procurement server computer comprising:
one or more hardware processors;
electronic digital computer memory coupled to the one or more hardware processors;
in the memory, a spend management layer that is programmed to execute managing buyer accounts associated with one or more buyer computers coupled via a network to the e-procurement server computer and supplier accounts associated with one or more supplier computers coupled via the network to the e-procurement server computer;
in the memory, a payment data management layer that is programmed to execute:
importing in real-time supplier invoice data from an enterprise resource planning system to the e-procurement server computer via a REST API protocol;
storing, in one or more JSON stores, transactional data relating to past transactions between a plurality of buyer entities and a plurality of supplier entities, the transactional data comprising a plurality of invoice objects with digital programmatic objects in the memory, each invoice object comprising one or more data fields that are programmatically linked to and storing data for an invoice between a supplier account and a buyer account, the one or more data fields including a remittance address that specifies an address to which a payment is to be sent;
determining a set of unique remittance addresses identified in the plurality of invoice objects, wherein each unique remittance address of the set of unique remittance addresses is associated with a distinct supplier account;
generating a first set of payment objects, each object of the first set of payment objects not fully populated with data and comprising a structure of a payment object having a reference to a supplier payment account and a buyer payment account, and locating a remittance address of the payment object in supplier payment account data associated with the reference to the supplier payment account;
querying the plurality of invoice objects in the JSON stores and determining that a particular unique remittance address of the set of unique remittance addresses is associated with multiple buyer entities of a particular buyer account, and in response, generating a second set of payment objects, each payment object of the second set of payment objects not fully populated with data, comprising a structure of a payment object, and associated with the particular unique remittance address and a distinct buyer entity of the multiple buyer entities;
removing, from the first set of payment objects, the payment object that is associated with the particular unique remittance address of the set of unique remittance addresses;
once the first set of payment objects and the second set of payment objects are generated, populating the first set of payment objects and the second set of payment objects with payment account data and automatically creating a batch of payment objects corresponding to the first set of payment objects and the second set of payment objects;
in response to a single action of a buyer computer in a graphical user interface (GUI), for each payment transaction, using a different payment model selected from bank account, credit card, digital check, and virtual card, sending requests to external computing devices to execute multiple payment transactions corresponding to the payment objects of the batch of payment objects based on the payment account data in the first set of payment objects and the second set of payment objects and auto-releasing the batch of payment objects based on a scheduled date and time, thus using fewer CPU cycles and less memory than required to pay every invoice between the supplier account and the buyer account stored in the one or more JSON stores and conserving network bandwidth by only executing transactions based on the first set of payment objects and the second set of payment objects after optimization.

2. The e-procurement server computer of claim 1, wherein the first set of payment objects and the second set of payment objects include multiple payment objects with different currencies.

3. The e-procurement server computer of claim 1, each of the payment objects defining data fields of an invoice comprising an invoice identification (ID), a total amount due, a supplier account ID, a buyer account ID, a legal entity of a buyer account, a currency type, a payment method, and a remittance address to which a payment is to be sent.

* * * * *